US005754948A

United States Patent [19]
Metze

[11] Patent Number: 5,754,948
[45] Date of Patent: May 19, 1998

[54] MILLIMETER-WAVE WIRELESS INTERCONNECTION OF ELECTRONIC COMPONENTS

[75] Inventor: George M. Metze, Charlotte, N.C.

[73] Assignee: University of North Carolina At Charlotte, Charlotte, N.C.

[21] Appl. No.: 581,409

[22] Filed: Dec. 29, 1995

[51] Int. Cl.$^6$ ............................................. H04B 7/00
[52] U.S. Cl. ............................ 455/66; 455/74; 455/90
[58] Field of Search ......................... 455/66, 90, 87, 455/77, 550, 556, 41, 74, 300, 333, 49.1; 379/163, 169, 152

[56] References Cited

U.S. PATENT DOCUMENTS

| | | | |
|---|---|---|---|
| 4,612,670 | 9/1986 | Henderson | 455/607 |
| 4,703,471 | 10/1987 | Fitelson et al. | 370/1 |
| 4,733,093 | 3/1988 | Graves et al. | 250/551 |
| 4,850,044 | 7/1989 | Block et al. | 455/607 |
| 5,113,403 | 5/1992 | Block et al. | 359/152 |
| 5,245,680 | 9/1993 | Sauter | 385/24 |
| 5,335,237 | 8/1994 | Lang et al. | 359/130 |
| 5,335,361 | 8/1994 | Ghaem | 455/66 |
| 5,349,461 | 9/1994 | Huynh et al. | 359/152 |
| 5,362,961 | 11/1994 | Hamanka | 250/216 |
| 5,515,364 | 5/1996 | Fague | 370/20 |
| 5,621,913 | 4/1997 | Tuttle et al. | 455/90 |

FOREIGN PATENT DOCUMENTS

| | | |
|---|---|---|
| 54-136128 | 10/1979 | Japan. |
| 3-178230 | 8/1991 | Japan. |

*Primary Examiner*—Reinhard J. Eisenzopf
*Assistant Examiner*—Darnell R. Armstrong

[57] ABSTRACT

A millimeter-wave wireless data transmission link is utilized to interconnect multiple electronic components within an enclosed electronic system. More specifically, an electronic apparatus includes a housing, a plurality of separated electronic components located within the housing, and a plurality of millimeter-wave transmit/receive integrated circuit devices, each coupled to a corresponding one of the separated electronic components. Data is transmitted between the plurality of separated electronic components via the millimeter-wave transmit/receive integrated circuit components, each of which includes one or more transmit/receive circuits preferably operating at frequencies above 35 GHz. The transmit and receiving frequencies of the transmit/receive integrated circuit devices can be dynamically set in memory to enable transmission links to be easily reconfigured.

20 Claims, 5 Drawing Sheets

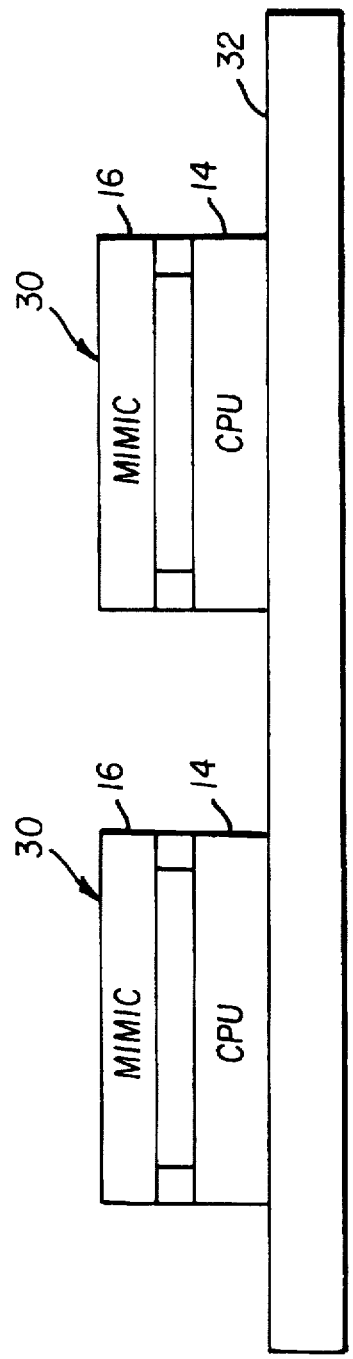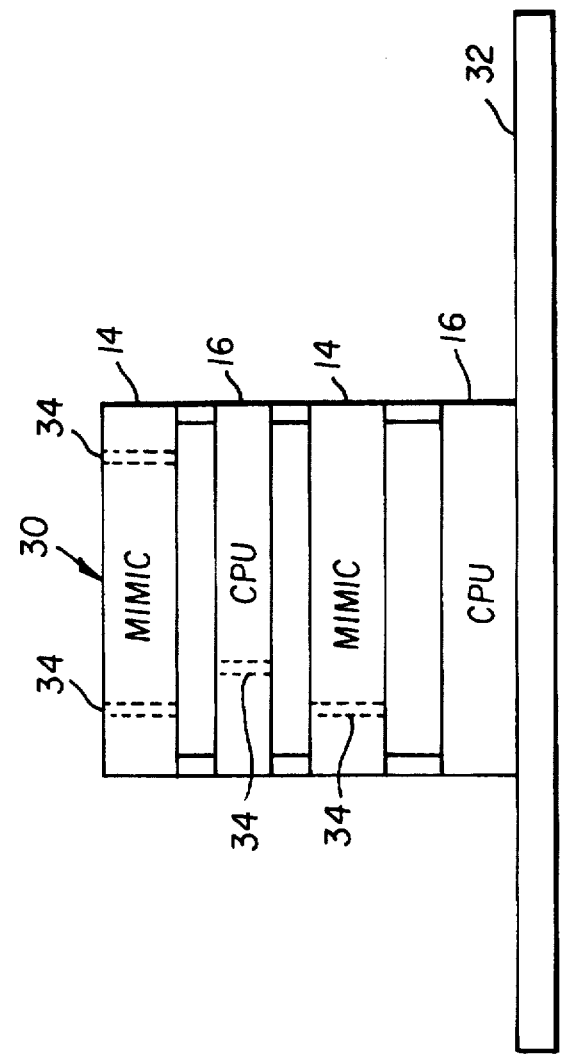

MILLIMETER-WAVE WIRELESS INTERCONNECTION OF ELECTRONIC COMPONENTS

FIELD OF THE INVENTION

The invention relates generally to systems for providing interconnection between a plurality of electronic components separated from one another within an enclosed electronic system. In particular, the invention relates to a wireless interconnection system that utilizes a reconfigurable, frequency selective, millimeter-wave communication link to provide data transmission between separate electronic components within an enclosed electronic system.

BACKGROUND

There is an expanding need to increase the speed of computers to process ever increasing amounts of data. Computer architects and engineers have traditionally approached the problem of increasing overall computation speed and power by increasing the clock frequency of a computers central processing unit and/or by utilizing a plurality of parallel processing units. In practice, increases in speed have been achieved, in part, by decreasing the physical dimensions within the processing unit, between the processing unit and a corresponding memory cache, and/or between parallel processors, thereby shortening the required signal path length between elements.

The combination of faster operating speeds and higher electronic component and wiring densities, however, make that task of maintaining signal integrity extremely difficult due to parasitic reactances, impedance mismatches, crosstalk, dispersion and frequency-dependent skin losses. Accordingly, the clock rate of high speed digital systems has conventionally been limited by packaging and electrical interconnection technology and not by the actual switching time of individual transistors utilized in the processing unit. The fastest transistors, for example, have switching times on the order of 10 picoseconds, while the risetime of a typical electrical backplane (or electrical "bus") might be only 10 nanoseconds, i.e., on the order of 1000 times slower than the transistor switching speed. Thus, the limiting speed factor in the system is not the operation of individual components, but the interconnect technology the permits data transfer between components within the system.

Further, electronic circuits are currently arranged in planes, whether on VLSI chips, multi-chip modules, printed circuit boards, or in backplanes. Most computers systems typically have many multi-chip modules and printed circuit boards with interconnections that often take indirect paths causing a reduction in system performance and complications in layout architecture. In such systems, data transfer rates are not only degraded by the inductances, resistances and capacitances associated with the electrical integration of the components as mentioned above, but suffer from a speed-related problem, commonly referred to as a "race condition", caused by the fact that signals traveling through electrical conductors have phase velocities significantly below the speed of light, such that information sent to two different points in space will arrive at different times. This difference in time can lead to complications in the sharing and processing of information from multiple processing units in parallel processing systems. Finally, hard-wired interconnection channels cannot be easily modified or reconfigured, and security integrity of hard-wired data links can ultimately be compromised through the identification of data routing paths between system components.

Seeking an alternative to traditional hard-wired electrical interconnections, a number of researchers have explored using optical (infrared) links to interconnect mainframes, modules, boards, chips and even intra-chip connections using a variety of alternative approaches. For example, digital data could be delivered between integrated circuit chips, printed circuit boards or multi-chip modules using waveguides, fiber optic couplings or free space transmission. Each of the different approaches to utilizing optical interconnections has its own set of unique advantages and disadvantages.

Perhaps the most interesting approach is the utilization of free space optical interconnect technology in which data is transmitted by optical transceivers between printed circuit boards or components utilizing a laser transmission. There are major impediments, however, to the successful implementation of such technology including, for example, the requirement for critical alignment between optical transceivers, upper limits to drive/modulation frequency of laser components, and expense. More specifically, the source (laser emitting element) and detector (photodiode) of the optical transceivers not only have to be within "line-of-sight", but must also be critically aligned to maximize efficiency. Further, all commercial semiconductor lasers are inherently very low impedance devices, which cannot be easily impedance matched nor modulated at frequencies above 1–2 GHz (typically), and the cost for a highly stable and reliable semiconductor laser can be as high as $10–20K per laser, making the overall expense of the system too prohibitive for all but the most expensive mainframe computers.

In view of the above, it is an object of the invention to provide a system and method for interconnecting electronic components that overcomes the deficiencies of optical interconnection discussed above. It is a further object of the invention to provide an interconnect system and method that can be inexpensively implemented using existing commercially available technologies. It is a still further object of the invention to provide an interconnect system and method that is both secure and easily reconfigured.

SUMMARY OF THE INVENTION

The present invention utilizes millimeter-wave wireless data transmission links to interconnect multiple electronic components within an enclosure. Data transmission paths within the enclosed electronic system can be dynamically reconfigured by selecting the operating frequency of individual millimeter-wave wireless data transmission links. The utilization of the millimeter-wave wireless data transmission links overcomes the deficiencies associated with optical data links such as the alignment problems discussed above.

More specifically, an electronic apparatus in accordance with a preferred embodiment of the invention includes an enclosure or housing, a plurality of separated electronic components located within the housing, wherein each of the separated electronic components is coupled to a corresponding millimeter-wave transmit/receive integrated circuit device. Data is transmitted between the plurality of separated electronic components via the millimeter-wave transmit/receive integrated circuit components, each of which includes one or more transmit/receive circuits preferably operating at frequencies above 35 GHz. The electronic components and millimeter-wave transmit/receive integrated circuit devices can be implemented as discrete components mounted on printed circuit boards, as components that are mounted together to form multichip modules, or as components that are monolithically integrated within a common substrate.

BRIEF DESCRIPTION OF THE DRAWINGS

With the above as background, the invention will be described in greater detail with reference to certain preferred embodiments thereof and the accompanying drawings, wherein:

FIG. 4 illustrates the formation of CPUs and MIMICs as modules located on a carrier;

FIG. 5 illustrates a module of the type illustrated in FIG. 4 that includes multiple CPUs and MIMICs.

DETAILED DESCRIPTION OF THE PREFERRED EMBODIMENTS

Figure 1:
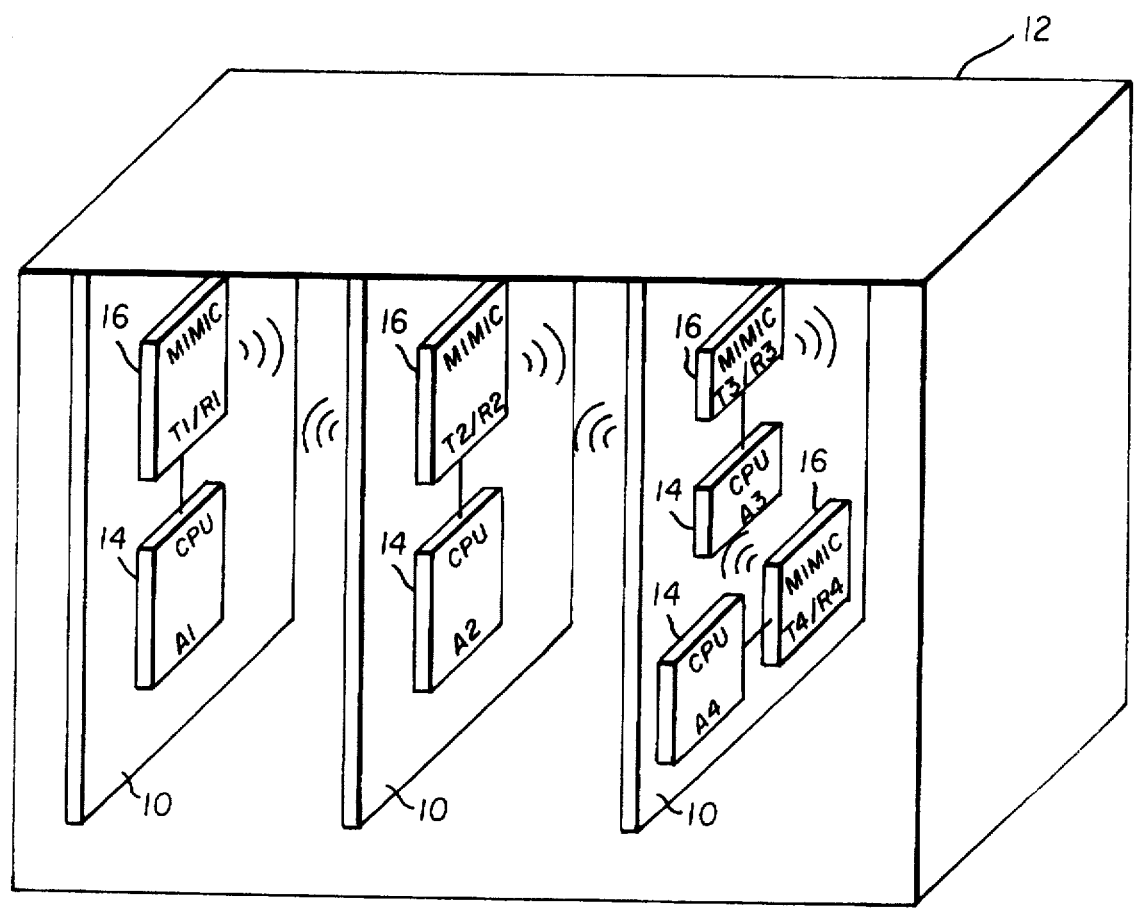
FIG. 1 is a schematic block diagram of a system incorporating the present invention.

The invention incorporates the use of millimeter-wave transmit/receive integrated circuit devices to transmit and receive digitally encoded data between separated circuit components within an enclosed electronic system. Specifically, GaAs-based MIMIC transmit/receive integrated circuit devices, operating at high bandwidth millimeter-wave frequencies, are preferably coupled to corresponding circuit components, for example digital processing units commonly referred to as "CPUs", to provide a millimeter-wave wireless data communications link between the circuit components. In a proposed system in accordance with the invention, data from one CPU within a computer system is simultaneously transmitted to other CPUs within the computer system through the use of the millimeter-wave data communications link to achieve true parallel transmission of data. Each CPU can effectively simultaneously exchange data with any other CPU in the system, whether the CPUs are located on the same circuit board, on different circuit boards, within the same multichip module or within a different multichip module.

Unlike optical links, the millimeter-wave data communication link does not need to be line-of-sight. Accordingly, data transmitted from one CPU can be received by every other CPU in the system without requiring the alignment of the CPUs into any specific architecture configuration, thereby greatly easing the designers ability to define an acceptable system architecture. Data is therefore shared between CPUs without the requirement of the critical line-of-sight alignments required by optical communication links. Further, and unlike traditional hardwired data links, information is shared between multiple CPUs without suffering dispersion and "race condition" problems.

The use of a the millimeter-wave data communication link provides additional advantages including higher modulation bandwidth as compared with hardwired links, and lower costs as compared with optical links. Wide bandwidth MIMICs operating at well above 100 GHz are now commercially available. Thus, transferring data at rates well above a few GBits/sec can be achieved. The cost of commercially available MIMIC chips has also dropped by two orders of magnitude over the last several years. Typical costs of a MIMIC chip now range between $10–20/square mm, which provides an economic advantage over alternative optical interconnect approaches.

Information is preferably encoded in the system using a frequency division multiplexing technique with differential quaternary phase shift keying (DQPSK), although other encoding techniques may also be employed. In a preferred embodiment, each CPU is assigned its own unique carrier identification frequency that is fully programmable or reconfigurable, such that the carrier frequency of the transmit and receive MIMIC corresponding to each CPU can be dynamically (in memory) adjusted. That is, the frequency to which a particular MIMIC is tuned (the frequency tuning address corresponding to a particular CPU) is encoded in memory. Using this approach, the required chip bandwidth is greatly relaxed and well within current technology. For example, the required millimeter-wave bandwidth for a system operating with a CPU clock rate of 100 MHz (assuming 32 Bits/Word) would be 3.2 GHz, which is easily achieved utilizing existing technology.

Using the programmable frequency division multiplex technique, any particular CPU can talk to any (or all) other CPUs simultaneously. The receiving CPU need only tune its corresponding MIMIC to the correct frequency of the transmitting CPU. The choice of tuned frequency is preferably determined by an overall system controller that stores the appropriate frequency addresses in memory. System operation is therefore somewhat analogous to an individual radio being tuned to an FM station in order to receive a transmission from a specific transmitter.

Turning now to FIG. 1, a basic system in accordance with the invention includes a plurality of circuit boards 10 located within an enclosure or housing 12 of an electronic apparatus such as a computer system. Each of the circuit boards 10 includes at least one CPU 14 that is coupled to a corresponding transmit/receive MIMIC 16. The transmission and reception frequencies of each of the transmit/receive MIMIC 16 are programmable or adjustable based on a control signal, for example a frequency address, supplied to each transmit/receive MIMICs 16 by a central controller, which can either be a separate device coupled to each transmit/receive MIMIC 16 or one of the illustrated CPUs 14. Accordingly, the transmission and reception frequencies can be programmed to permit each CPU 14 to transmit data to any or all of the remaining CPUs 14 through the transmit/receive MIMICs 16.

For example, in the illustrated embodiment, if the MIMIC 16 labelled T1/R1 transmits at frequency f2 and receives at frequency f1 and the MIMIC 16 labelled T2/R2 transmits at frequency f1 and receives at frequency f2, data can be readily transmitted between the CPUs 14 labeled A1 and A2. Similarly, by programming each of the MIMICs 16 to receive at frequency f2, data can be transmitted from the CPU 14 labelled A1 to all of the CPUs 14 in the system. Thus, the system can be dynamically reconfigured to allow data transmission between any combination of the CPUs 14.

The enclosure 12 is preferably constructed of a material that reflects the signals transmitted by the MIMICs 16 and prevents external signals from causing interference. Accordingly, the entire area within the enclosure 12 is saturated by the transmitted signals of the MIMICs 16, thereby permitting CPUs 14 to be located anywhere within the enclosure 12 and still receive the transmitted signals. In such a case, conventional signal processing techniques are preferably employed to prevent interference problems due to multiple transmission paths.

Figure 2:
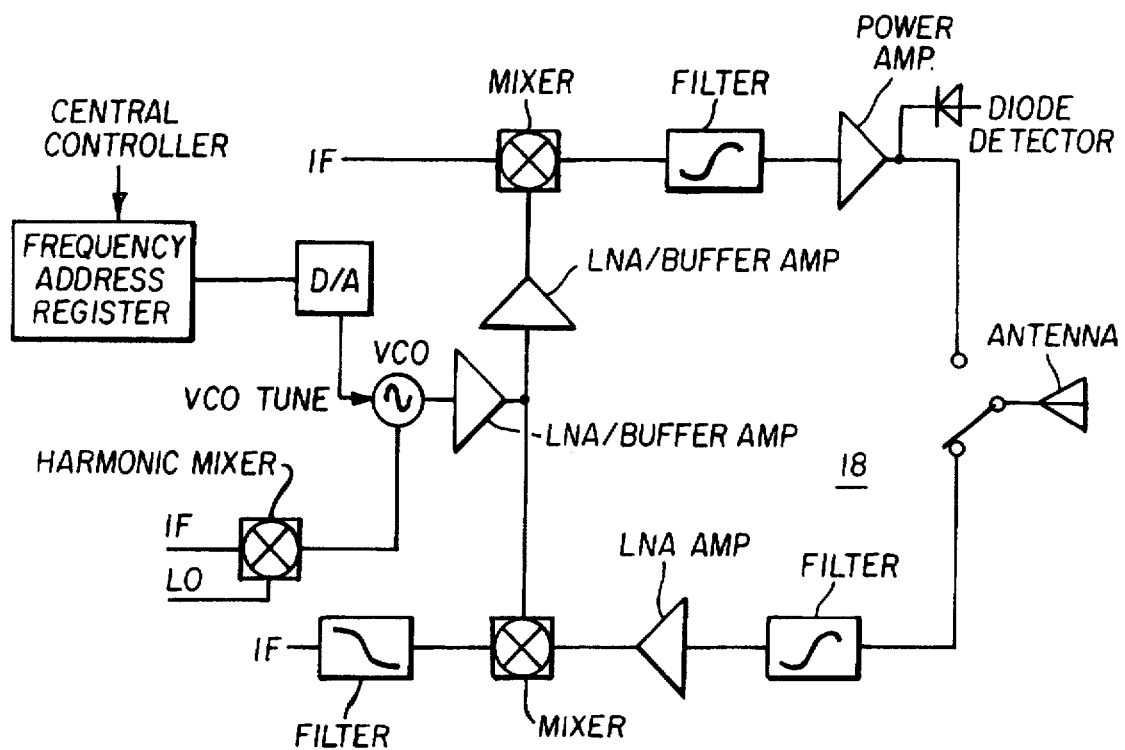
FIG. 2 is a schematic circuit diagram of a transmit/receive circuit incorporated in the MIMIC illustrated in FIG. 1.

As shown in greater detail in FIG. 2, each of the MIMICs 16 includes at least one transmit/receive circuit 18 having a voltage controlled oscillator (VCO). The transmit/receive circuit 18 is programmed or adjusted to a particular transmission or reception frequency by applying a VCO tune signal to the voltage controlled oscillator. The VCO tune signal, for example, is preferably supplied from a "frequency address" register (located within the corresponding CPU, memory or the transmit/receive circuit 18 itself), which is loaded with a frequency control address by the central controller. The frequency control address is converted to an analog signal that is applied to the voltage controlled oscillator in order to adjust the transmit/receive frequency of the transmit/receive circuit 18.

Alternatively, if a dynamically configurable system is not desired, the transmit/receive circuit 18 can be fixed to a particular frequency of operation. In this case, each MIMIC is preferably provided with a plurality of transmit/receive circuits 18, each operating at a slightly different frequency. Thus, any particular CPU coupled to its corresponding MIMIC can still transmit/receive at a number of unique or distinctive frequencies, with each frequency corresponding to a unique data transmission link.

The transmit/receive circuit 18 preferably operates at frequency ranges above 35 GHz, and most preferably at frequencies between 60 GHz and 94 GHz, as MIMICs operating in this frequency range are readily available and provides sufficient bandwidth and channel capability. It will be understood, however, that other frequencies may be utilized and still fall within the standard I.E.E.E. definition of "millimeter-wave" for purposes of this invention.

Figure 3:
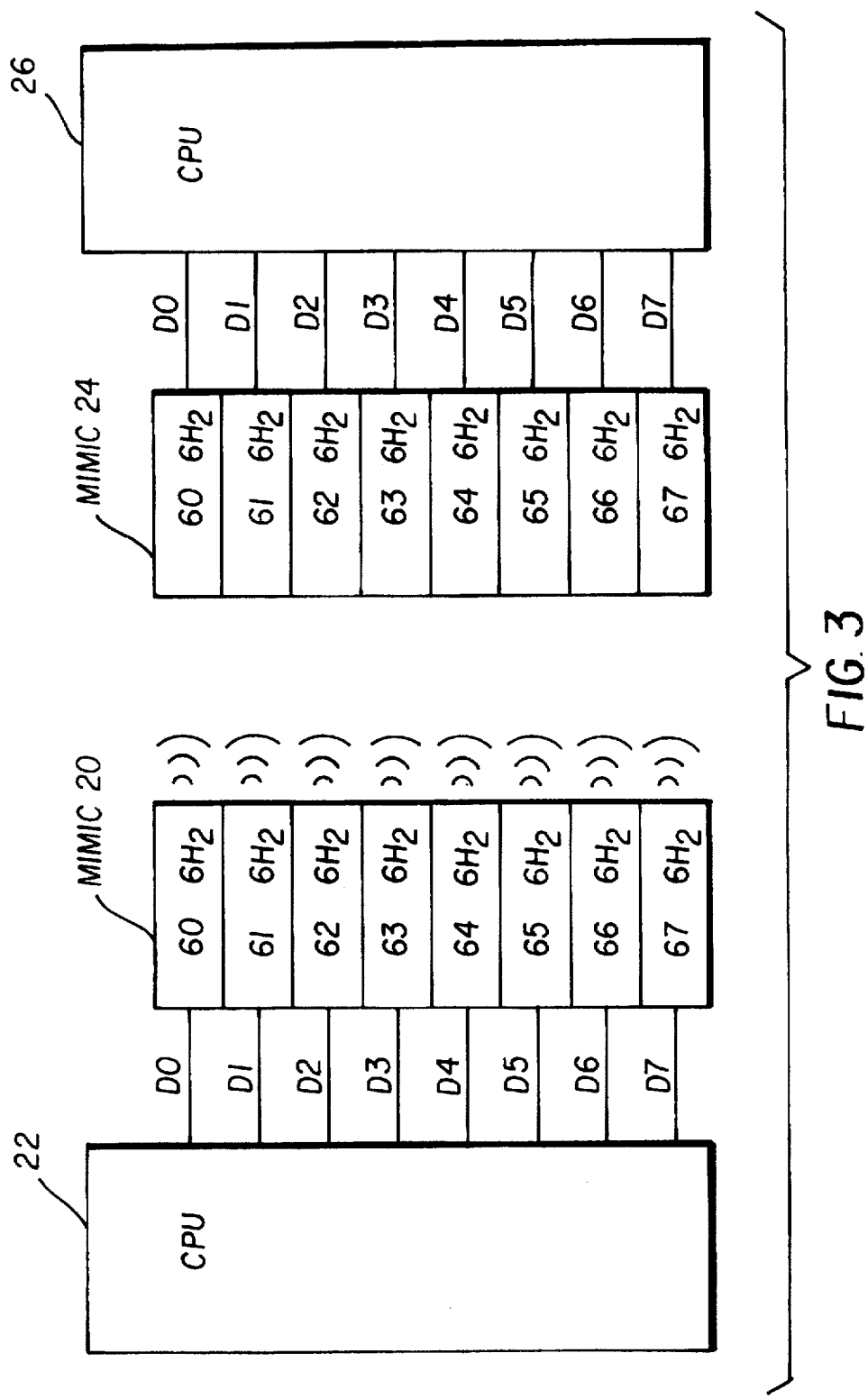
FIG. 3 is a schematic block diagram illustrating parallel data transmission between two MIMICs.

Data is supplied from the CPUs 14 to the MIMICs 16 in either serial or parallel form, depending upon speed/data processing requirements, for either serial or parallel transmission. If data is supplied in parallel to the MIMICs 16, it may be desirable to incorporate a plurality of transmit/receive circuits 18 within each MIMIC 14 to handle individual data bits of a data word. For example, in a system employing an eight bit data word (DO–D7) illustrated in FIG. 3, a MIMIC 20 coupled to a corresponding CPU 22 includes eight transmit/receive circuits 18, each transmit/receive circuit 18 corresponding to a received data bit and programmed to operate at a different frequency (60 GHz–67 GHz). Another MIMIC 24, also including a corresponding number of transmit/receive circuits 18, is programmed to receive at the transmission frequencies of the first MIMIC 20 so that data word received from the CPU 22 by the MIMIC 20 is transmitted in parallel to the MIMIC 24 and subsequently transferred to a second CPU 26.

In some cases, however, it may be desirable to split the transmission of the data word to two or more different CPUs. For example, the programmability of the system allows a third CPU to be programmed to receive the most significant bits of the data word while the second CPU is programmed to receive the least significant data bits. Alternatively, the multiple transmit/receive circuits 18 can be utilized to transmit individual or some multiple of bits to a plurality of locations.

Although the MIMICs 16 and CPUs 14 have been illustrated as separate devices for purposes of simplification, it will be understood that the MIMICS 16 and CPUs 14 may be flip chip bonded or "bump" bonded together to form a single modular device 30 as illustrated in FIG. 4. A plurality of the modular devices 30 may then be incorporated on a common carrier substrate 32. A plurality of carrier substrates 32 are then incorporated within the housing 12 of the electronic apparatus. Still further, multiple CPUs 14 and MIMICs 16 may be bonded together to form the modular devices 30 as illustrated in FIG. 5. Although the millimeter-waves generated by the MIMICs 16 will propagate through the entire structure, it is further desirable to include a plurality of via holes 34 in the different device layers, where possible, to reduce signal attenuation. The via holes 34 may also be utilized in the circuit boards 10 illustrated in FIG. 1 to reduce signal attenuation if desired.

Figure 6:
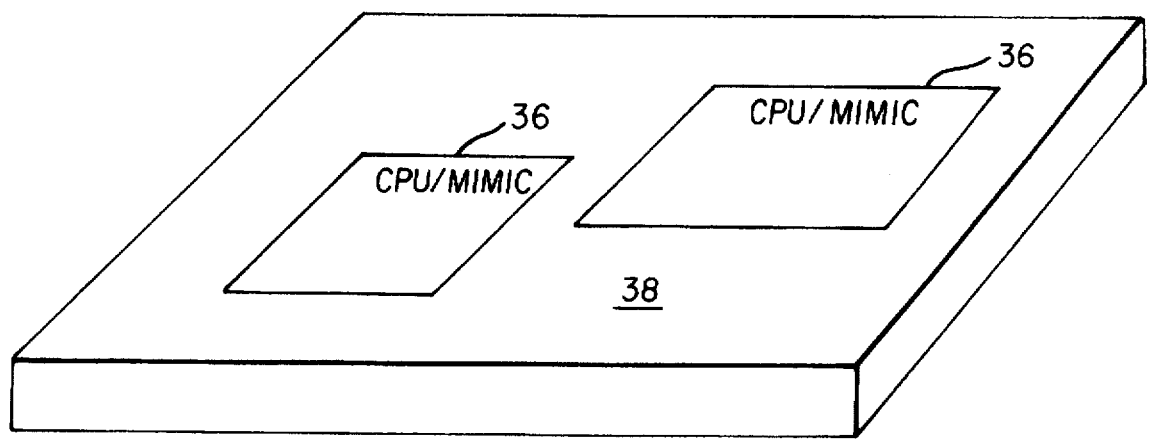
FIG. 6 illustrates the formation of CPUs and MIMICS, either individual or combined, on a common substrate.

The invention is not limited to utilizing separate CPUs and corresponding MIMICs. In fact, a CPU and its corresponding MIMIC may be monolithically formed in a common substrate 38 as a combined CPU/MIMIC 36 as illustrated in FIG. 6. Still further, multiple combined CPU/MIMICS 36 may be monolithically integrated into the common substrate. A plurality of the common substrates are then provided within the housing 12 of the electronic apparatus.

The invention has been described with reference to certain preferred embodiments thereof. It will be understood, however, that modifications and variations are possible within the scope of the appended claims. For example, while the illustrated embodiments have shown the interconnection between CPUs, the millimeter-wave communications link may be incorporated to interconnect any type of electronic component requiring data transfer, and is not limited to general purpose processors. Still further, other forms of data encoding, such as polarization selectivity, time division multiplexing, etc., may be readily employed.

What is claimed is:

1. An apparatus comprising:

a housing;

a plurality of separated electronic components located within the housing; and a plurality of millimeter-wave transmit/receive integrated circuit devices having transmission frequencies of at least 35 GHz;

wherein each of the millimeter-wave transmit/receive integrated circuit devices is coupled to receive data from a corresponding one of the separated electronic components; and wherein data from at least one of the plurality of separated electronic components is transmitted to at least one other of the plurality of separated electronic components via the millimeter-wave transmit/receive integrated circuit devices.

2. An apparatus as claimed in claim 1, wherein each millimeter wave transmit/receive integrated circuit device includes at least one transmit/receive circuit.

3. An apparatus as claimed in claim 2, wherein at least one of a transmitting frequency and a receiving frequency of the transmit/receive circuit is adjustable.

4. An apparatus as claimed in claim 2, wherein a transmitting frequency and a receiving frequency of the transmit/receive circuit are fixed.

5. An apparatus as claimed in claim 1, wherein the millimeter-wave transmit/receive integrated circuit devices operate at frequencies between 60 GHz and 94 GHz.

6. An apparatus as claimed in claim 1, wherein at least one electronic component is bonded to its corresponding millimeter wave transmit/receive integrated circuit device to form a modular device.

7. An apparatus as claimed in claim 1, wherein at least one electronic component and its corresponding millimeter wave transmit/receive integrated circuit device are monolithically formed in a common substrate.

8. An apparatus as claimed in claim 2, wherein the transmit/receive circuit includes a voltage controlled oscillator that controls an operating frequency of the transmit/receive circuit based on a received tune signal.

9. An apparatus as claimed in claim 8, wherein the voltage controlled oscillator receives the tune signal from a frequency address register coupled to the voltage controlled oscillator.

10. An apparatus as claimed in claim 2, further comprising adjustment means for dynamically adjusting at least one of a transmitting frequency and a receiving frequency of the transmit/receive circuit.

11. An apparatus as claimed in claim 10, wherein the adjustment means includes a frequency address register.

12. An apparatus comprising a housing;

a plurality of separated electronic components located within the housing; and a plurality of millimeter-wave transmit/receive integrated circuit devices, each coupled to received a data word comprising a plurality of data bits from a corresponding one of the separated electronic components and to transmit the data word to at least one other of the separated electronic components; and wherein at least one of said plurality of millimeter-wave transmit/receive integrated circuit devices transmits different bits of a common data word at different transmission frequencies.

13. An apparatus as claimed in claim 11, wherein at least one of said plurality of millimeter-wave transmit/receive integrated circuit devices transmits a first group of bits of the common data word at a first frequency and a second group of bits of the common data word at a second frequency.

14. An apparatus as claimed in claim 11, wherein each millimeter-wave transmit/receive integrated circuit device includes at least one transmit/received circuit.

15. An apparatus as claimed in claim 14, wherein at least one of a transmitting frequency and a receiving frequency of the transmit/receive circuit is adjustable.

16. An apparatus as claimed in claim 13, wherein a transmitting frequency and a receiving frequency of the transmit/receive circuit are fixed.

17. An apparatus as claimed in claim 11, wherein the millimeter-wave transmit/receive integrated circuit devices operate at frequencies above 35 Ghz.

18. An apparatus as claimed in claim 11, wherein the millimeter-wave transmit/receive integrated circuit devices operate at frequencies between 60 Ghz and 94 Ghz.

19. An apparatus as claimed in claim 13, wherein the transmit/receive circuit includes a voltage controlled oscillator that controls an operating frequency of the transmit/receive circuit based on a received tune signal, and wherein the voltage controlled oscillator receives the tune signal from a frequency address register coupled to the voltage controlled oscillator.

20. An apparatus as claimed in claim 13, further comprising adjustment means for dynamically adjusting at least one of a transmitting frequency and a receiving frequency of the transmit/receive circuit.

* * * * *